United States Patent [19]

Clay, Jr. et al.

[11] Patent Number: 4,957,301
[45] Date of Patent: Sep. 18, 1990

[54] NON-CRUSHABLE SIDE SEAL MEMBERS FOR A ROLL-UP DOOR

[75] Inventors: Roy T. Clay, Jr., Snyder; Donald J. Whiting, Jr., Akron, both of N.Y.

[73] Assignee: Whiting Roll-Up Door Mfg., Corp., Akron, N.Y.

[21] Appl. No.: 416,050

[22] Filed: Oct. 2, 1989

[51] Int. Cl.⁵ .............................................. B60J 10/00
[52] U.S. Cl. ..................................... 277/12; 277/227; 277/207 R; 277/186; 277/181; 277/95; 277/53; 160/40; 49/485
[58] Field of Search ................ 277/12, DIG. 7, 181, 277/182, 186, 189, 53, 207 R, 95, 227; 49/485, 197, 489, 493, 494; 160/40, 210

[56] References Cited

U.S. PATENT DOCUMENTS

| | | | |
|---|---|---|---|
| 2,827,114 | 3/1958 | Stroup | 160/201 |
| 3,198,242 | 8/1965 | Crosswell | 160/40 |
| 3,227,205 | 1/1966 | Crosswell | 160/40 |
| 3,339,619 | 9/1967 | Crosswell | 160/40 |
| 3,693,693 | 9/1972 | Court | 160/201 |
| 4,119,325 | 10/1978 | Oakley et al. | 49/493 |
| 4,575,099 | 3/1986 | Nash | 277/12 |
| 4,643,239 | 2/1987 | Wentzel | 49/197 |

*Primary Examiner*—William A. Cuchlinski, Jr.
*Assistant Examiner*—Daniel G. DePumpo

[57] ABSTRACT

A seal member (11) is adapted to seal the gap or space between a door panel (12) and frame (13) of a roll-up door assembly (10). The improved seal member includes a first portion (34) and a second portion (35). The first portion is mounted on the frame, and the second portion is biased to flexibly engage the outer surface of the door panel. The first portion is formed of a relatively-rigid vinyl, while the second portion is formed of a relatively-flexible vinyl, or may be in the form of a brush. The first portion has a raised abutment surface (42) arranged to engage the door panel, should the door panel move toward the frame, to prevent the second portion from becoming crushed between the first portion and the door. Thus, the second portion is protected from damage, and does not substantially impede vertical movement of the door. The first and second portions may be formed integrally or separately, as desired. In one form, the seal member first portion is adapted to be snapped into engagement with the frame.

27 Claims, 3 Drawing Sheets

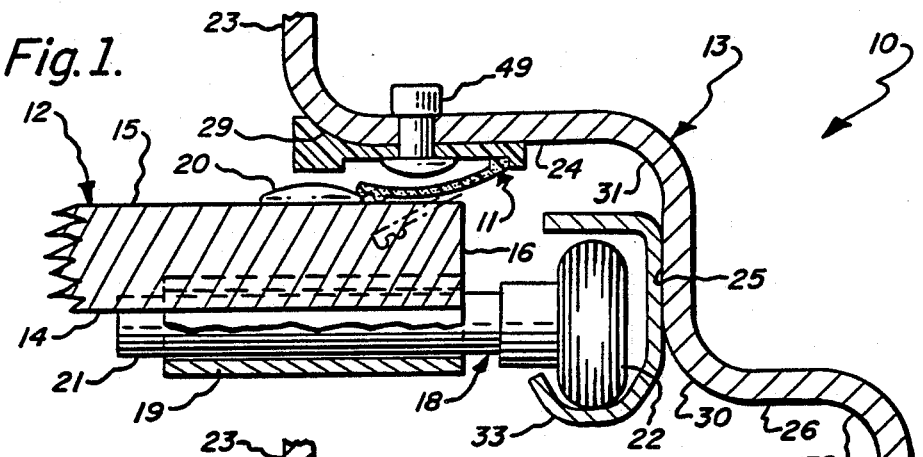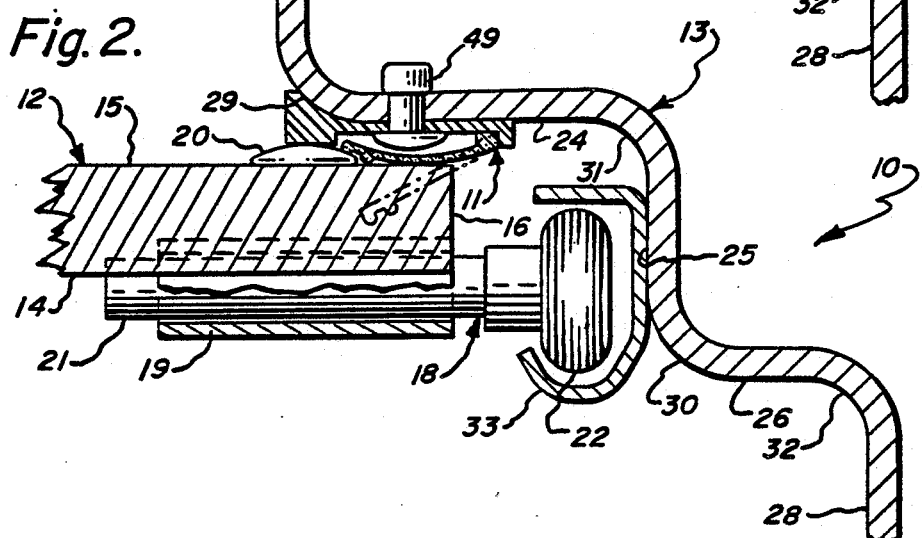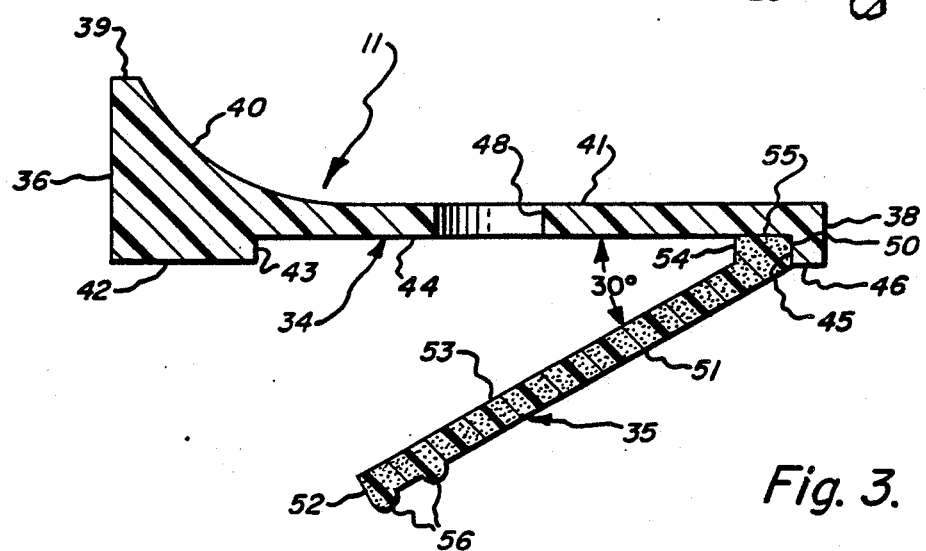

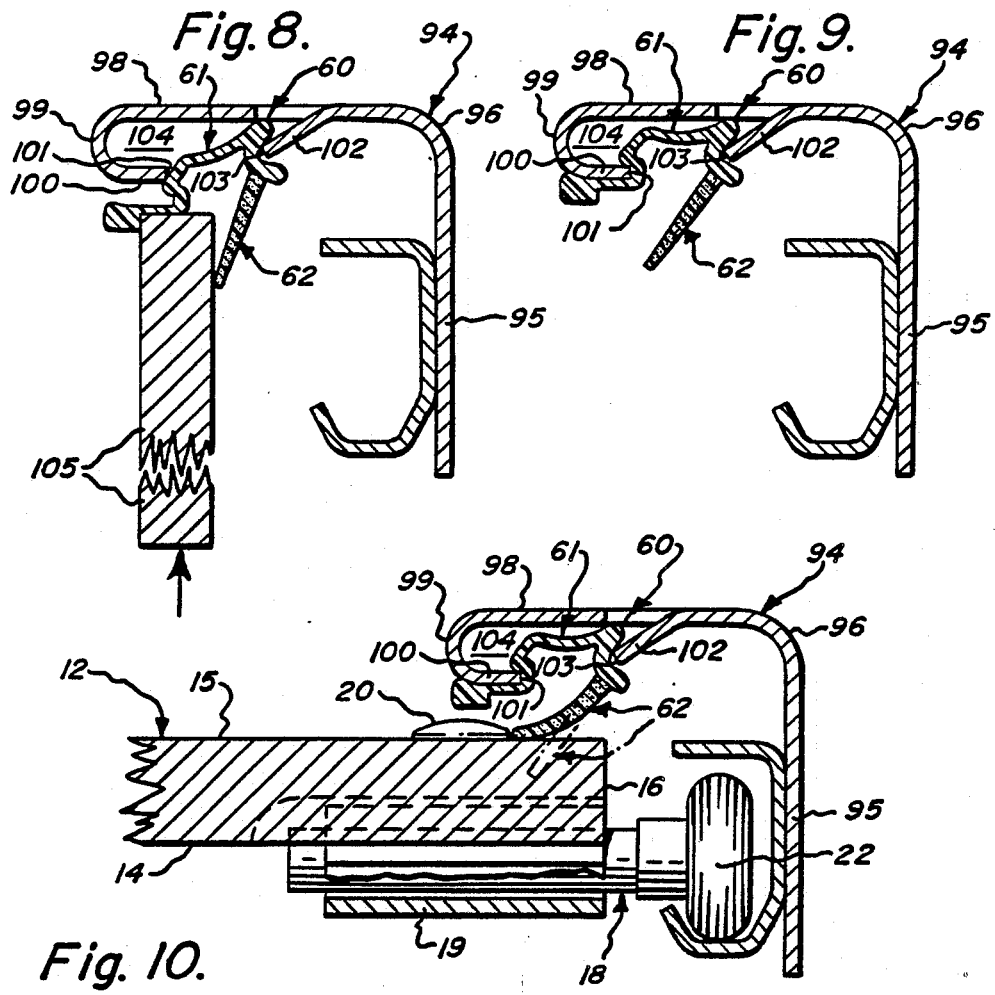
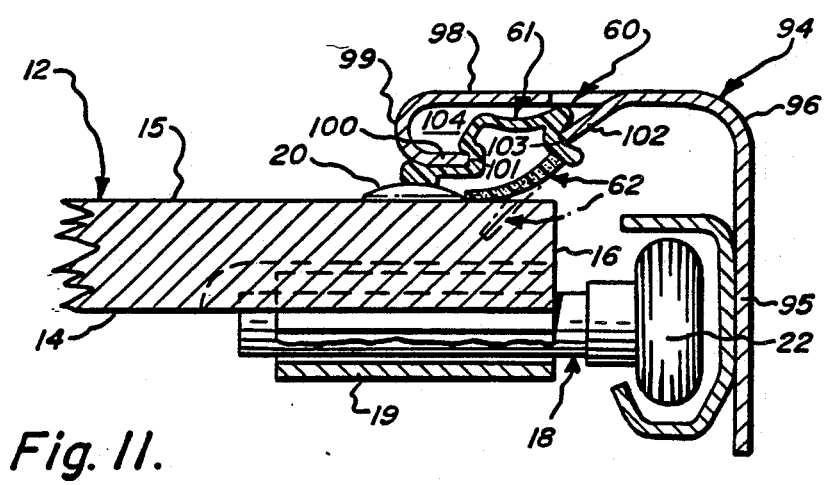

NON-CRUSHABLE SIDE SEAL MEMBERS FOR A ROLL-UP DOOR

TECHNICAL FIELD

This invention relates generally to the field of sealing devices, and, more particularly, to an improved seal member for flexibly and continuously sealing the space between two relatively-movable facing surfaces, such as the door and frame of a roll-up truck door or the like.

BACKGROUND OF THE INVENTION

It is often desired to provide a seal member for sealing the space between two facing surfaces capable of movement relative to one another.

The improved seal member disclosed herein is particularly adapted for use between the substantially-parallel facing surfaces of a multiple-panel roll-up door, when in its vertical (i.e., lowered or closed) position, and the vertical portion of an associated support frame. Such doors are commonly used on trucks, trailers, and similar commercial-type vehicles. The facing surfaces of each door panel and the associated support frame are generally free to move horizontally toward and away from one another (e.g., attributable to horizontal fore-and-aft relative movement between the vehicle and the door), and are also adapted to move vertically relative to one another in substantially-parallel planes when the door is opened and closed.

It would, of course, be preferable to cushion such fore-and-aft relative "bumping" movement between the panel and frame to prevent the seal member from becoming damaged. However, such cushion should not substantially impede relative vertical movement therebetween when the door is opened or closed. In addition, the seal member should practically seal the facing surfaces to substantially inhibit foreign matter (e.g., rain, ice, snow, etc.) from entering the space between the door panel and the vehicle support frame, which matter might otherwise hinder efficient operation of the door and support frame mechanism or adversely affect the contents of the cargo compartment.

Accordingly, it would be generally desirable to provide an improved seal member which is durable, which may be quickly and easily attached to the frame, which will itself effectively cushion relative "bumping" between the surfaces, which will effectively seal the space between the overlapped surfaces, which may be readily removed for the purposes of repair or replacement, and which will nevertheless readily permit relative vertical movement between the facing door and frame surfaces, without substantial impediment, when and if desired.

DISCLOSURE OF THE INVENTION

With parenthetical reference to corresponding parts, portions or surfaces of the preferred embodiment for purposes of illustration, this invention, in one aspect provides an improved seal member (e.g., 11) for operatively closing and sealing the gap or space between relatively-movable first and second surfaces (e.g., 24,15) arranged in facing relation to one another, such surfaces being mounted for relative movement in a horizontal direction toward and away from one another and being also mounted for relative movement in substantially-vertical parallel planes. The improved seal member broadly comprises: a first portion (e.g., 34) mounted fast to one of the surfaces (e.g., surface 24), the first portion having a first abutment surface (e.g., 42) extending toward a portion of the other of the surfaces; and having a second portion (e.g., 35) cantilevermounted on the first portion and extending away therefrom to flexibly and slidably engage the other of the surfaces (e.g., 15), the abutment surface being so positioned and arranged that the abutment surface will engage the second surface when said surfaces move relatively toward one another to prevent said second portion from being crushed or compressively sandwiched between the first portion and the other surface, or otherwise damaged; whereby the second portion will not substantially impede relative vertical movement between the surfaces in the parallel planes.

In another aspect, the invention provides an improvement for use in a structure (e.g., a roll-up or upwardly-acting door) having a first member (e.g., 94) provided with a first surface (e.g., 100), and having a second member (e.g., 12) provided with a second surface (e.g., 15), and wherein portions of the first and second surfaces are arranged to face one another, a recess (e.g., 104) extending into the first member from the first surface, the first and second surfaces being mounted for relative movement in directions substantially-perpendicular and substantially-parallel to at least one of the surfaces. The improvement includes an improved seal member which is operatively arranged to seal the space between the facing portions of the surfaces. The seal member has a first portion (e.g., 61) adapted to be removably received in the first member recess, and has a second portion (e.g., 62) extending away from the first portion and biased to engage the second surface. The seal member is so configured and arranged as to permit such desired relative movement between the first and second surfaces without crushing or otherwise substantially-damaging the seal member second portion. In one version, the seal member second portion is fixedly joined to the first portion thereof, but has a hardness less than that of the first portion. For example, the second portion may have a hardness on the order of about 68–74 on the Shore "A" scale. In another version, the second portion is adapted to be removably attached to the first portion. This enhances the utility of the seal member for the purposes of repair or replacement, should only the second portion be damaged. The seal member first portion is preferably extruded from a suitable relatively-rigid polyvinylchloride material (e.g., having a hardness of about −80 on the Shore "D" scale [ASTM D−80]). The second portion may be in the form of much elongated eel-like fin, or as a brush-like device having a large number of bristles which are biased to engage the second surface.

Accordingly, the general object of the invention is to provide an improved seal member for use in sealingly closing the gap between two spaced and facing relatively-movable surfaces, such as in a roll-up or upwardly-acting door structure.

Another object is to provide an improved seal member that will cushion "bumping" together of such surfaces, and yet permit relatively uninhibited vertical movement, while continuously maintaining a practical sealed engagement between the two surfaces, to substantially prevent foreign matter from entering the space between them.

Another object is to provide a flexible side seal that is readily adaptable for use in connection with vertical roll-up doors for trucks, trailers and similar vehicles.

Still another object is to provide an improved seal member that is durable, which enjoys an extended useful life, and which may be readily attached and detached, either in whole or in part, from the supporting frame.

These and other objects and advantages will become apparent from the foregoing and ongoing written specification, the drawings, and the appended claims.

BRIEF DESCRIPTION OF DRAWINGS

FIG. 1 is a fragmentary transverse horizontal sectional view of a first form of the improved seal member, this view showing the seal member as being operatively arranged to seal the gap between a vertically-disposed door frame and a facing right marginal end portion of a door panel of a vehicle-mounted roll-up door assembly, this view also showing the door panel as having been moved away from the frame (i.e., downwardly from the portion shown in FIG. 2).

FIG. 2 is a view similar to FIG. 1, but showing the door panel as having been moved upwardly toward the frame (i.e., from the position shown in FIG. 1) and engaging upwardly the abutment surface on the seal member first portion.

FIG. 3 is an enlarged transverse horizontal sectional view of the improved seal member shown in FIGS. 1 and 2, with the frame and door panel removed for clarity of illustration.

FIG. 8 is a reduced fragmentary horizontal transverse sectional view of a vehicle-mounted upwardly-acting door structure, this view showing the second form of seal member as being about to be mounted on the supporting frame of the vehicle.

FIG. 9 is a fragmentary horizontal transverse sectional view thereof, similar to FIG. 8, but shows the first portion of the seal member as being received in the frame recess and in interlocked engagement with the frame.

FIG. 10 is a further-reduced fragmentary horizontal transverse sectional view of the second form, this view showing the seal member first portion as being in interlocked engagement with the frame, and showing the seal member second portion as engaging a door panel when the door has moved away from the frame.

FIG. 11 is a further-reduced fragmentary horizontal transverse sectional view of the second form, similar to FIG. 10, but showing the door as having been moved toward the frame such that the head portion of a panel-mounted fastener engages the seal member first abutment surface to limit further movement of the first and second surfaces toward one another.

MODE(S) OF CARRYING OUT THE INVENTION

Figure 4:
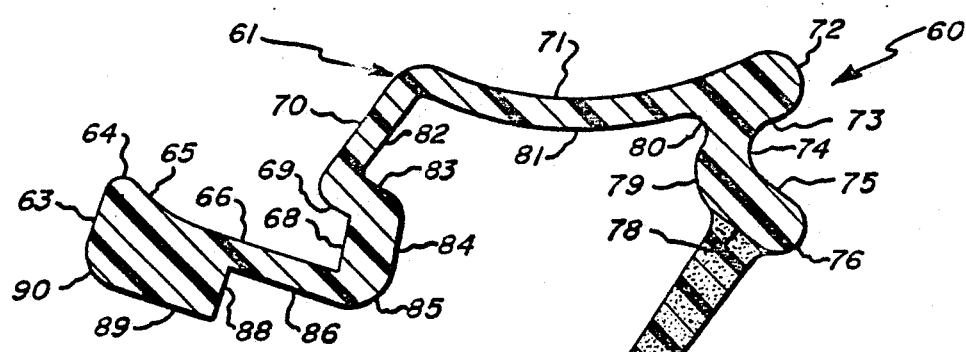
FIG. 4 is a transverse horizontal sectional view of a second form of the improved seal member, this embodiment having the first and second portions thereof formed of different hardnesses.

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

This invention broadly provides an improved seal member which is particularly adapted for use in substantially closing and sealing the gap or space between the facing marginal end surfaces of a door panel and associated vehicle-mounted support frame of an upwardly-acting roll-up door assembly, such as commonly used on trucks, trailers and other cargo-carrying vehicles. However, it should be clearly understood that the improved seal member possesses general utility, and is not limited to use with such vehicles or door assemblies. For example, the improved seal could be used to seal the space or gap between a door panel and a stationary frame or track, such as commonly found in household garage doors, industrial doors and the like. While the invention will now be described in the environment of a vehicle-mounted roll-up door, it should be appreciated that this is merely one possible application. Accordingly, the scope of the appended claims should not be limited to this particular end use, unless an explicit limitation to that effect appears therein.

FIRST EMBODIMENT (FIGS. 1-3)

Referring now to the drawings, and, more particularly, to FIGS. 1 and 2 thereof, a fragmentary portion of a vehicle-mounted roll-up door assembly, generally indicated at 10, is shown as having a first form of the improved seal member, generally indicated at 11, operatively arranged to act between the right marginal end portion of a lowered vertically-disposed door panel 12 and a portion of the supporting frame 13. In doors of this type, the upper and lower margins of adjacent panels are hinged together for guided articulated movement along parallel inverted L-shaped tracks provided on either side of the cargo body opening. Each track typically has a vertically-disposed lower portion (of which a fragmentary portion is indicated at 13), a horizontally-disposed upper or overhead portion (not shown), and an arcuate transitional portion (not shown)

therebetween. Hence, when the door is lowered to engage the sill, the several panels will be generally vertically disposed, one above the other. On the other hand, when the door is raised, the panels will be moved to a horizontally-disposed overhead out-of-the-way position.

FIG. 1 depicts a fragmentary right marginal end portion of one panel 12, when such panel is in its lowered vertically-disposed position. This panel is shown as having, in pertinent part, horizontally-elongated substantially-vertical inner and outer planar surfaces 14,15, and a vertical right end face 16 extending therebetween. A roller assembly, generally indicated at 18, is shown as being operatively mounted on the inside surface of the door panel. This roller assembly has a cylindrical sleeve member 19 mounted on the inner surface of the door by means of a suitable fastener (not fully shown). This fastener has a button-like rounded head portion 20 extending outwardly (i.e., upwardly in FIGS. 1 and 2) from panel outer surface 15. The other portions of this sleeve member and fastener are deemed to be collateral to an understanding of the structure and operation of the improved seal member, and have therefore not been shown. A shaft 21 is received in sleeve member 19, and extends rightwardly therefrom beyond panel right end face 16. A freely-rotatable roller member 22 is mounted on the right marginal end portion of the shaft.

The frame 13 is a vertically-elongated specially-configured member which is bent, or otherwise formed, to have a somewhat-undulating appearance, when viewed in transverse cross-section (FIGS. 1 and 2). More particularly, frame 13 is shown as sequentially including: a leftwardly-facing planar vertical surface 23, a downwardly-facing planar horizontal surface 24, a leftwardly-facing planar vertical surface 25, a downwardly-facing planar horizontal surface 26, and a leftwardly-facing planar vertical surface 28. The transitional surfaces 29,30 between surfaces 23,24 and 25,26, respectively, are shown as being convex and rounded. The other transitional surfaces 31,32 between surfaces 24,25 and 26,28, respectively, are shown as being concave and rounded. Each of transitional surfaces 29,30,31,32 tangentially joins its neighboring planar surfaces.

A vertically-elongated leftwardly-facing C-shaped track or guide rail 33 is suitably secured to frame surface 25, and faces into the cargo bay opening to receive and capture the roller member 22. Thus, roller 22 is constrained within the track for guided movement therealong. As comparatively illustrated in FIGS. 1 and 2, the roller and door panel may move horizontally toward and away from frame surface 24, such movement being limited by the dimensional difference between the roller and the track. The reverse is also true, namely, that during starting and stopping of the vehicle, the frame may move horizontally relative to the panel. In either event, it is clear that panel outer surface 15 is mounted for horizontal relative movement toward and away from frame surface 24 within the limits permitted by the dimensions of the roller and the track. In FIG. 1, the roller and panel are shown as having been moved fully away from frame surface 24, whereas the roller and panel are shown as having been moved fully toward frame surface 24 in FIG. 2. These two figures depict the extreme positions of such relative horizontal movement of the door and roller relative to the frame.

Referring now to FIG. 3, the improved seal member 11 is depicted as being a vertically-elongated specially-configured member, which includes (in transverse crossssection): a horizontally-disposed relatively-rigid first portion 34, and a relatively-flexible second portion 35 extending downwardly and leftwardly in the nature of a cantilever from the right margin of first portion 34. The first portion is shown as having planar vertical left and right end faces 36,38; an upper surface which sequentially includes a planar horizontal surface 39 extending rightwardly from the upper margin of left end face 36, an upwardly- and rightwardly-facing concave arcuate surface 40 configured to complimentarily engage frame transitional surface 29, and a planar horizontal surface 41 extending rightwardly therefrom to join the upper margin of right end face 38; and a lower surface which sequentially includes a downwardly-facing planar horizontal surface 42 extending rightwardly from the lower margin of left end face 36, a rightwardly-facing planar vertical surface 43, a downwardly-facing planar horizontal surface 44, a leftwardly-facing planar vertical surface 45, and a downwardly-facing planar horizontal surface 46 continuing rightwardly therefrom to join the lower margin of right end face 38. Seal member surfaces 40,41 are arranged to engage frame surfaces 29,24, respectively. A vertical through-hole 48 communicates surfaces 41,44 to accommodate passage of the shank portion of a rivetlike fastener 49 (FIGS. 1 and 2) by which the seal member may be secured to the frame. Surface 42 forms a raised first abutment surface which, in this form, is positioned more closely to fastener head 20 than any other portion of the seal member first portion is positioned relative to the panel. Thus, abutment surface 42 is arranged to selectively engage a portion of the panel (i.e., fastener head 20), as described infra.

The seal member second portion 35 is shown as extending downwardly and leftwardly away from the right marginal end portion of the first portion, much in the nature of a cantilever. More particularly, the second portion is sequentially bounded by: a planar vertical right end face 50 arranged to engage first portion surface 45, a downwardly-and rightwardly-facing inclined planar surface 51, a downwardly- and leftwardly-facing planar distal end face 52, an upwardly- and leftwardly-facing inclined planar surface 53 substantially parallel to surface 51, a leftwardly-facing planar vertical surface 54, and an upwardly-facing planar horizontal surface 55 continuing rightwardly therefrom to join the upper margin of right end face 50. A pair of longitudinally-spaced nubs, severally indicated at 56, extends the entire elongated length of the seal member and extends outwardly from surface 51 to continuously engage panel outer surface 15, as shown in FIGS. 1 and 2. Surfaces 44,53 are formed to be arranged at an acute included angle of about 30°, prior to assembly. In the foregoing description of the seal member, references to "upwardly", "downwardly", "leftwardly", "rightwardly", "horizontally" and "vertically", simply indicate the orientation of the described surface as it appears in FIG. 3, it being recalled that FIG. 3 depicts the seal member in transverse horizontal cross-section, and that the seal member is elongated along an axis extending out of the paper so as to seal the entire length of the gap.

In this form, the first and second seal member portions are formed of a suitable vinyl, as by our extrusion technique, with the first portion being relatively hard and rigid, and the second portion being relatively soft and flexible. Suitable techniques exist in the prior art for forming such a composite member to have different portions of varied hardnesses. Thus, in this form, the first and second portions have specifically different hardnesses. For example, the relatively-hard first portion may have a hardness of about −80 on the Shore "D" scale, and the relatively-soft second portion may have a hardness of about 68-74 on the Shore "A" scale. While polyvinylchloride ("PVC") is a preferred material, it should be clearly understood that the entire seal member, or at least the first or second portion thereof, may be formed of other materials as well. Accordingly, the invention should not be limited to the dual-hardness vinyl embodiment shown and described, unless explicit limitations to this effect appear in the appended claims.

In any event, in this form, the first portion is mounted fast to the frame by means of rivet 49 or some other suitable fastener, as shown in FIGS. 1 and 2, with the second portion in a biased or flexed condition such that nubs 56 will continuously engage the door panel outer surface. If the panel moves away from the frame to the extreme position shown in FIG. 1, the nubs will remain engaged with the panel through compliant flexure or bending of the cantilevered second portion. Of course, this second portion serves to close the gap between the frame and panel to inhibit the entrance of weather (i.e., rain, snow, ice) and other contaminants into the cargo body.

On the other hand, if the door moves toward the frame, as shown in FIG. 1, the second portion will compliantly bend or flex to accommodate such motion. Such movement of the panel may continue until raised abutment surface 42 engages the head of fastener 20, as shown in FIG. 2. Thus, the abutment of surfaces 20,42 provides a stop to limit further relative movement of the door and frame toward one another, and precludes the moving door from crushing or damaging the softer and more-compliant seal member second portion. Hence, the second portion will not become compressively sandwiched or crushed between the door and the first portion, and such second portion will offer little increased frictional resistance to vertical movement of the door regardless of its horizontal position relative to the frame. In other words, the door may be readily opened at all relative horizontal positions between the door and frame.

SECOND EMBODIMENT (FIGS. 4 AND 8-11)

A second form of the improved seal member is illustrated in FIGS. 4 and 8-11. FIG. 4 depicts the undeformed or free transverse cross-section of this second form, FIGS. 8-9 depict the manner by which the side member is attached to the frame, and FIGS. 10-11 depict the seal member as effectively closing the space between the frame and panel at different relative horizontal positions therebetween.

Referring now to FIG. 4, the second form of the improved seal member, generally indicated at 60, is shown as including a first portion 61 and a second portion 62 extending away from the right margin of the first portion, again much in the nature of a cantilever. The first portion is shown as being sequentially bounded by: an upwardly- and leftwardly-facing planar surface 63, an upwardly-facing rounded convex surface 64, a concave arcuate surface 65, an upwardly- and rightwardly-facing inclined planar surface 66, a leftwardly- and upwardly-facing inclined planar surface 68, a leftwardly- and downwardly-facing inclined planar surface 69, a leftwardly- and leftwardly-facing inclined planar surface 70, an upwardly-facing concave surface 71, an upwardly- and upwardly-facing generally-semicircular surface 72, a rightwardly- and downwardly-facing inclined planar surface 73, a rightwardly-facing concave surface 74, an upwardly- and rightwardly-facing inclined planar surface 75, a rightwardly- and downwardly-facing generally-semicircular surface 76, a leftwardly- and downwardly-facing inclined planar surface 78, a leftwardly-facing quarter-round convex surface 79, a leftwardly- and downwardly-facing concave surface 80, a downwardly-facing convex surface 81 generated about the same point (not shown) as surface 71, a rightwardly- and downwardly-facing inclined planar surface 82, a rightwardly-and upwardly-facing inclined planar surface 83 generally parallel to surface 69, a rightwardly-and downwardly-facing inclined planar surface 84 generally parallel to surface 68, a downwardly-facing convex surface 85, a leftwardly- and downwardly-facing inclined planar surface 86 generally parallel to surface 66, a rightwardly- and downwardly-facing inclined planar surface 88, a leftwardly- and downwardly-facing inclined planar surface 89, and a leftwardly-facing quarter-round convex surface 90 rejoining surface 63.

The second portion 62 is shown as extending downwardly- and leftwardly from surface 78 in the nature of a cantilever. More particularly, the second portion is bounded by a leftwardly- and upwardly-facing inclined planar surface 91, a leftwardly- and downwardly-facing inclined planar end surface 92, and a rightwardly- and downwardly-facing inclined planar surface 93 rejoining surface 78. Moreover, the second portion is shown as being tapered toward distal end surface 92. The entire seal member 60, including the first and second portions thereof, are formed integrally, as by extruding the same, of a suitable plastic (e.g., vinyl) or resilient material. However, the first portion 61 is relatively-hard and rigid and the second portion is relatively-soft and flexible. Here again, the first portion may have a hardness on the order of about −80 on the Shore "D" scale, and the second portion may have a hardness on the order of 68-74 on the Shore "A" scale.

The manner by which the second form of the improved seal member is installed in the frame, is comparatively illustrated in FIGS. 8 and 9. In this form, the frame 94 is shown as being formed of sheet metal stock, suitably bent, rolled or otherwise formed to the shape illustrated. More particularly, the frame is shown as including, in pertinent part; a vertical portion 95, a quarter-round transitional portion 96, a horizontal portion 98 extending leftwardly therefrom, a reversely curved or semi-circular transitional portion 99, and a horizontal portion 100 continuing rightwardly therefrom and terminating in a planar vertical end face 101. An intermediate part of portion 98 between transitional portions 96,99 is struck downwardly through an angle of about 30° to provide a downwardly-and leftwardly-inclined tab 102 which terminate in an end face 103. In this form, the leftwardly-facing C-shaped track 104 is suitably secured to the left face of frame portion 95. The portion of the frame between portions 102, 98, 99 and 100 defines a vertically-elongated enlarged recess 104 to which access may be had through the narrowed entrance space between end faces 101, 103.

Seal member 60 is removably mounted on the frame by first inserting surface 72 through the entrance, and by thereafter orienting the seal member such that tab end face 103 generally engages seal member concave surface 74, as shown in FIG. 8. Seal member surface 70 will not fit through the narrowed entrance without being deformed. To this end, the operator may simply place a block 105 of wood, or some other material, against seal member surface 86 and strike it with a hammer to drive the seal member in the direction of arrow 106. Seal member surface acts as an inclined plane, and deforms elastically to pass through the entrance to the frame recess. Once so deformed and inserted, the seal member attempts to resume its original shape, with frame end face 101 received in the seal member recess defined by surfaces 66,68,69. Thus, once snapped into the frame recess, the seal member is in interlocked engagement with the frame (as shown in FIG. 9), and cannot be readily removed therefrom except by reverse deformation of the appropriate portions of the seal member. Thus, this second form of seal member simply snaps into engagement with the frame, thereby obviating the need for fastener 49 of the first embodiment. At the same time, seal member surface 89 forms an abutment surface which is spaced more closely to a proximate portion of the door panel (i.e., button surface 20) than any other portion of seal member foot portion 61.

Referring now to FIGS. 10 and 11, the seal member second portion 62 is biased to flexibly engage the door panel, again indicated at 12. If desired, the seal member second portion could be provided with raised nubs, such as indicated at 56 in FIG. 3, to facilitate the effectiveness of the seal. Thus, when the door is moved away from the frame to the maximum extent as shown in FIG. 10, seal member second portion 62 will remain in flexibly-compliant continuous engagement with the door panel. On the other hand, when the door panel is moved toward the frame (as shown in FIG. 11), abutment surface 89 will engage fastener head 20 to prevent the seal member second portion from being crushed between the panel and seal member first portion 61.

THIRD EMBODIMENT (FIGS. 5-7)

Figure 5:
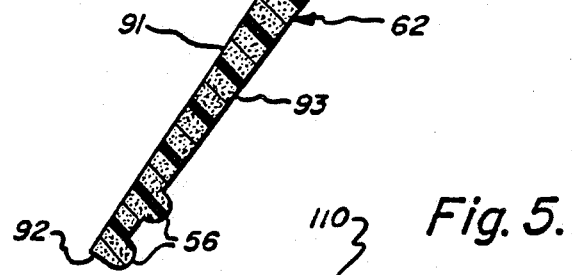
FIG. 5 is a transverse horizontal sectional view of a third form of the improved seal member, this view showing the first and second portions as being formed separately, but configured such that an enlarged head portion of the seal member second portion is in exploded aligned relation to an enlarged cavity or recess provided in the first portion.
Figure 6:
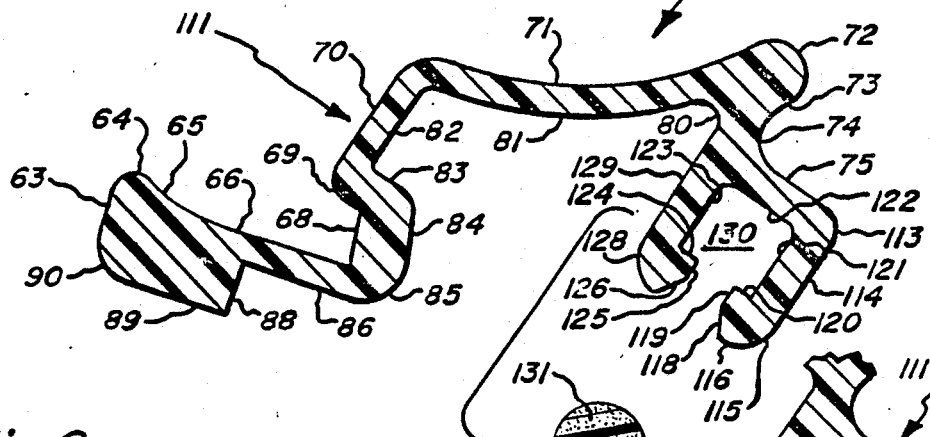
FIG. 6 is a fragmentary transverse horizontal sectional view of the third form, similar to FIG. 5, but showing the enlarged head portion of the seal member second portion as being received in the first portion enlarged cavity.

A third form of the improved seal member is shown in FIGS. 5 and 6. This form, generally indicated at 110, is shown as having a relatively-hard and rigid first portion 111 and a relatively-soft and flexible second portion 112. If desired, these two portions may be formed of a suitable polyvinylchloride material having the hardnesses indicated above. However, in this form the first and second seal member portions are physically separable from one another.

The first portion 111 is generally similar to the first portion of the snap-in second form, except to the extent that it has been modified as described infra. More particularly, the seal member first portion includes surfaces 63–75 and 81–90 as previously described. However, in this third form, surface 75 is followed by: a rightwardly-facing quarter-round convex surface 113, a downwardly- and rightwardly-facing planar surface 114, a downwardly-facing quarter-round surface 115, a downwardly- and leftwardly-facing planar surface 116, a leftwardly- and upwardly-facing planar surface 118, another leftwardly- and upwardly-facing planar surface 119, and upwardly- and rightwardly-facing planar surface 120, a leftwardly- and upwardly-facing planar surface 121, a downwardly-and leftwardly-facing planar surface 122, a downwardly- and rightwardly-facing planar surface 123, an upwardly and rightwardly-facing planar surface 124, a downwardly- and rightwardly-facing planar surface 125, another downwardly- and rightwardly-facing planar surface 126, a leftwardly-facing quarter-round surface 128, and an upwardly- and leftwardly-facing planar surface 129 continuing therefrom to join surface 80. Surfaces 118,126 form a tapered approach to a narrowed entrance portion (i.e., between surfaces 119,125), leading into an enlarged cavity 130 (i.e., defined by surfaces 120–124).

The seal member second portion is again shown as having side surfaces 91, 93, and as terminating in a lower distal end surface 92, as previously described. However, in this form, the upper end of the seal member second portion is confined as a vertically-elongated outwardly-facing cylindrically-segmented surface 131, which is adapted to be selectively passed through the approach and narrowed that portions, though elastic deformation of the walls defining the cavity portion and/or compressing the rounded head portion defined by surface 131 to enter enlarged cavity 130, as shown in FIG. 6. Thus, in this form, the seal member second portion is removably mounted on the seal member first portion. This arrangement facilitates repair or replacement should only the second portion be damaged.

Figure 7:
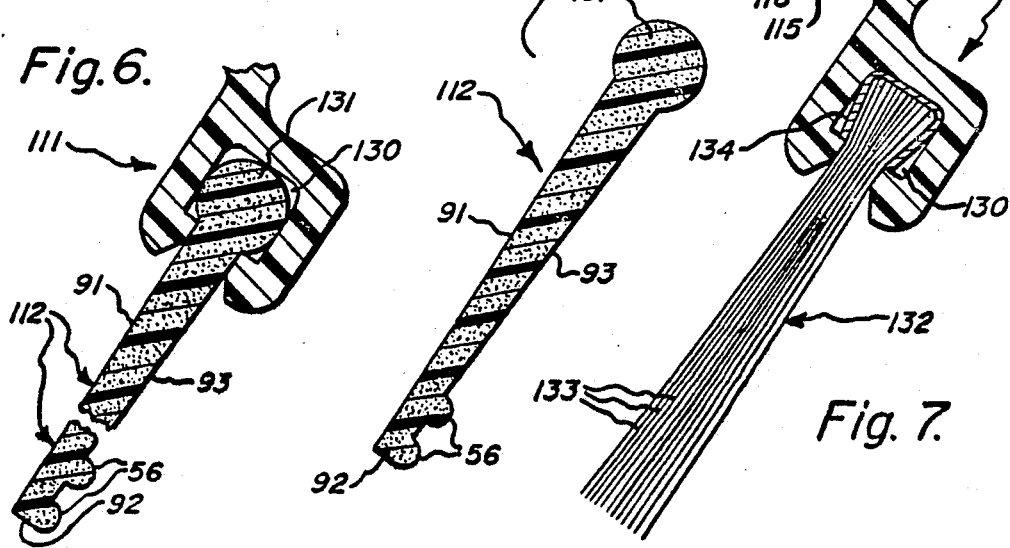
FIG. 7 is a fragmentary transverse horizontal sectional view of the seal member first portion shown in FIG. 5, but showing the seal member second portion as being in the form of a vertically-elongated brush (i.e., extending out of the plane of the paper) having the bundled end of its bristles received in the first portion cavity.

A modification of this third form is shown in FIG. 7. In this embodiment, the seal member second portion, generally indicated at 132, is formed as a vertically-elongated brush. The upper marginal end portion of the individual bristles, severally indicated at 133, are shown as being held or bundled together within a crimped generally U-shaped clip 134. In FIG. 7, the bundled end of the brush is shown as being received in the first portion cavity 130, with the bristles extending downwardly and leftwardly therefrom. One advantage of this brush-type second portion is that the individual bristles tend to readily deform about the contour of obstructions in their path. For example, the bristles will readily deform about the contour of fastener head 20 to maintain an effective seal.

Therefore, the invention provides various forms of an improved seal member which is particularly adapted for use in effectively closing and sealing the gap or space between a roll-up door panel and a supporting frame, inter alia. The improved seal member includes a relatively-hard and inflexible first portion, and a relatively-soft and flexible second portion 35 which issues outwardly from the first portion and has a distal end portion arranged to flexibly engage the outer surface of the door. The second portion is framed to continuously engage the door both during relative lateral and vertical movement therebetween, and therefore maintains the integrity of the closure or seal. At the same time, the first portion abutment surface precludes the second portion from becoming caught between the first portion and the door. Hence, the flexible second portion offers little resistance to opening and closing of the door.

MODIFICATIONS

The present invention contemplates that many changes and modifications may be made. For example, the particular size, shape and configuration of the seal member, and its component first and second portions, is not deemed critical, and may be changed or varied. Indeed, the seal member may be alternatively mounted on the door panel such that its flexible second portion will engage the frame, if desired. While polyvinylchloride is preferred because techniques exist to cause the first portion to be relatively-hard and the second portion to be relatively-soft, other materials, or materials of the same hardness or different hardnesses, may be readily substituted therefor. As previously noted, the seal member may be formed integrally or separately, as desired. Moreover, the seal member second portion may be formed as a brush-like member having a large number of bristles which are individually biased to engage the door. These bristles will readily follow the contour of the surface against which they are biased, and will therefore form an effective seal. The improved seal member is not limited to use in sealing the vertical side space between a roll-up door an a frame. If desired, it may be used to seal the overhead or top gap between the door and frame, or the gap between other relatively-movable surfaces.

Therefore, while the presently-preferred form of the improved seal member has been shown and described, and several modifications and changes thereof discussed, persons skilled in this art will readily appreciate that various additional changes and modifications may be made without departing from the spirit of the invention, as defined and differentiated by the following claims.

We claim:

1. A seal member for sealing the gap between first and second surfaces arranged in facing relation to one another, said surfaces being mounted for movement toward and away from one another and being mounted for relative movement in substantially-parallel planes, said seal member comprising:

a first portion mounted fast to one of said surfaces, said first portion having a first abutment surface extending toward a portion of the other of said surfaces; and a second portion mounted on said first portion at a location spaced laterally from said first abutment surface and extending away from said first portion to flexibly engage the other of said surfaces, said abutment surface being so positioned and arranged that said abutment surface will engage said second surface when said surfaces move toward one another to prevent said second portion from being crushed between said first portion and said other surfaces;

whereby said second portion will not substantially impede relative movement between said surfaces in parallel planes.

2. A seal member according to claim 1 wherein said second portion has a plurality of nubs arranged to engage said second surface.

3. A seal member according to claim 1 wherein said first abutment surface is positioned more closely to said second surface than any other portion of said first portion.

4. A seal member according to claim 1 wherein said second surface has a second surface positioned more closely to said first portion than any other portion of said second surface and arranged to be engaged by said first abutment surface when said first and second surfaces move toward one another.

5. A seal member according to claim 4 wherein said second abutment surface is a portion of a fastener.

6. A seal member according to claim 1 wherein said second portion continuously engages said second surface throughout the permissible range of relative movement between said first and second surfaces.

7. A seal member according to claim 1 wherein said first portion is relatively rigid.

8. A seal member according to claim 7 wherein said first portion is formed of a relatively-rigid vinyl.

9. A seal member according to claim 7 wherein said second portion is relatively flexible.

10. A seal member according to claim 9 wherein said second portion is formed of a relatively-flexible vinyl.

11. A seal member according to claim 9 wherein said second portion has a plurality of bristles operatively arranged to engage said other surface.

12. A seal member according to claim 1 wherein said first portion has a surface configured to closely engage the contour of said one surface.

13. A seal member according to claim 1 wherein said first and second portions are formed integrally.

14. A seal member according to claim 1 wherein said first portion is provided with a recess having an enlarged cavity portion and a narrowed entrance portion, and wherein said second portion has an enlarged head portion arranged to be removably received in said cavity portion.

15. In a structure having a first member provided with a first surface, and having a second member provided with a second surface, and wherein portions of said first and second surfaces are arranged to face one another, a recess extending into said first member from said first surface, said first and second surfaces being mounted for relative movement substantially-perpendicular and substantially-parallel to at least one of said surfaces, the improvement which comprises:

a seal member operatively arranged to seal the space between said facing surfaces, said seal member having a first portion formed of a resilient material and having an undeformed shape, said first portion being adapted to be deformed to snap into said first member recess and adapted to expand into interlocked relation with said first member, said seal member also having a second portion extending away from said first portion and biased to engage said second surface, said seal member being so dimensioned and proportioned as to permit said relative movement between said surfaces without substantially damaging said second portion.

16. A seal member according to claim 15 wherein said interlocked relation provides the sole means of attachment between said seal member first portion and said first member.

17. A seal member according to claim 15 wherein said seal member first portion has a first abutment surface positioned more closely to said second surface than any other portion of said first portion.

18. A seal member according to claim 15 wherein said seal member first portion has a first abutment surface facing toward said second surface to limit relative movement of said first and second surfaces toward one another and to prevent said seal member second portion from being crushed between said seal member first portion and said second surface.

19. A seal member according to claim 15 wherein said seal member first and second portions are formed integrally with one another.

20. A seal member according to claim 19 wherein said seal member is formed of vinyl.

21. A seal member according to claim 19 wherein said seal member second portion is less hard than said seal member first portion.

22. A seal member according to claim 15 wherein said seal member second portion is removably attached to said seal member first portion.

23. A seal member according to claim 22 wherein one of said seal member first and second portions is provided with a recess having an enlarged cavity portion and a narrowed entrance portion, and wherein the other of said seal member first and second portions has an enlarged head portion arranged to be removably received in said enlarged cavity portion.

24. A seal member as set forth in claim 22 wherein said seal member second portion is formed of a solid vinyl.

25. A seal member as set forth in claim 22 wherein said seal member second portion has a plurality of bristles arranged to engage said second surface.

26. A seal member according to claim 15 wherein said structure is an upwardly-acting door having a plurality of panels, wherein said first member is a vertically disposed frame of said door, and wherein said second member is one of panel panels.

27. A seal member according to claim 26 wherein said seal member extends substantially the height of said frame.

* * * * *